(12) United States Patent
Mori et al.

(10) Patent No.: US 7,812,558 B2
(45) Date of Patent: Oct. 12, 2010

(54) DRIVING APPARATUS OF ELECTRIC MOTOR FOR REDUCTION ROLL

(75) Inventors: Ryuzo Mori, Minato-ku (JP); Wataru Fukushima, Minato-ku (JP); Katsuhiko Fukuma, Minato-ku (JP); Takashi Ishida, Minato-ku (JP)

(73) Assignee: Toshiba Mitsubishi-Electric Industrial Systgems Corporation, Tokyo (JP)

( * ) Notice: Subject to any disclaimer, the term of this patent is extended or adjusted under 35 U.S.C. 154(b) by 67 days.

(21) Appl. No.: 12/067,524

(22) PCT Filed: Aug. 3, 2006

(86) PCT No.: PCT/JP2006/315387
§ 371 (c)(1),
(2), (4) Date: Mar. 20, 2008

(87) PCT Pub. No.: WO2008/015747
PCT Pub. Date: Feb. 7, 2008

(65) Prior Publication Data
US 2009/0267554 A1  Oct. 29, 2009

(51) Int. Cl.
*H02P 7/00* (2006.01)
(52) U.S. Cl. .................. 318/432; 318/568.18; 318/623; 72/10.2; 72/10.3
(58) Field of Classification Search .................. 318/255, 318/268, 566, 568.18, 595, 596, 623, 628, 318/69, 136, 700, 772, 779, 799, 430, 432, 318/434; 72/6.2, 8.1, 10.2, 10.3
See application file for complete search history.

(56) References Cited

U.S. PATENT DOCUMENTS 3,683,653 A * 8/1972 Cox ............................ 72/10.2

4,460,852 A * 7/1984 Kondo et al. .................. 318/67

(Continued)

FOREIGN PATENT DOCUMENTS

JP  63-011082 A  1/1988

(Continued)

*Primary Examiner*—Bentsu Ro
*Assistant Examiner*—Antony M Paul
(74) *Attorney, Agent, or Firm*—Sughrue Mion, PLLC

(57) ABSTRACT

There is provided a driving apparatus of an electric motor for a reduction roll that can improve maximization of rolling performance and a speed decrease amount by making maximal use of torque that various electric motors can generate during material entry. The apparatus includes an upper electric motor speed controller that acquires an upper electric motor torque current reference based on a deviation between an actual upper electric motor speed and an upper electric motor speed reference; an upper electric motor torque current limiter and current controller that control torque of the upper electric motor; a lower electric motor speed controller that acquires a lower electric motor torque current reference based on a deviation between an actual lower electric motor speed and a lower electric motor speed reference; a lower electric motor torque current limiter and current controller that control torque of the lower electric motor; and a torque distribution controller provided between the upper and lower electric motor speed controllers and the upper and lower electric motor torque current limiters, that compares the upper and lower electric motor torque current references and a torque current limit value, and when either the upper or lower torque current reference exceeds the torque current limit value, adds that exceeding amount to the other torque current reference.

2 Claims, 2 Drawing Sheets

U.S. PATENT DOCUMENTS 4,566,299 A * 1/1986 Koyama et al. .............. 72/10.2
5,515,731 A * 5/1996 Weisshaar et al. ............. 73/659
5,806,357 A * 9/1998 Bouchillon et al. .......... 72/10.2
5,874,813 A * 2/1999 Bode et al. .................... 318/98

FOREIGN PATENT DOCUMENTS

| JP | 01-133607 A | 5/1989 |
| JP | 01-234086 A | 9/1989 |
| JP | 06-339714 A | 12/1994 |
| JP | 09-295016 A | 11/1997 |

* cited by examiner

DRIVING APPARATUS OF ELECTRIC MOTOR FOR REDUCTION ROLL

TECHNICAL FIELD

The present invention relates to a driving apparatus of electric motors for reduction rolls in a rolling mill in which top and bottom reduction rolls are driven by separate electric motors, the apparatus having such a function that the rolling capacity can be maximized and a speed decrease amount can be improved by making the most of the torques that can be produced by each of the electric motors during the entry of a material into the rolls.

BACKGROUND ART

In many conventional twin drive rolling mills in which a top reduction roll and a bottom reduction roll are driven respectively by an upper electric motor and a lower electric motor, there has been added load balance control which involves performing the proportional-integral control (PI control) of a difference in the upper and lower load current values supplied to the electric motors or a difference between the load current square values and performing feedback to a front portion of a speed control loop or a front portion of a current control loop (refer to Patent Document 1, for example) in order to make uniform the loads of the upper and lower electric motors that have each an independent control system.

However, when an imbalance amount of upper and lower loads increases due to the material entry condition, rolled material shape and the like during rolling, it is impossible to control the above-described differences by the conventional load balance control and there are cases where the torque current reference of the electric motor that drives the roll on the high load side reaches its limit value, whereas a large margin remains in the torque current reference of the electric motor that drives the roll on the light load side, thereby posing the problem that rolling torque becomes insufficient and a speed decrease amount during material entry increases. In particular, when differential peripheral speed control that involves positively giving a speed difference to the top and bottom rolls during material entry is performed in order to prevent a rolled material whose leading end is bowed upward from striking against table rollers, this phenomenon occurs remarkably due to a high load during material entry and an increase in the imbalance amount.

Patent Document 1: Japanese Patent Laid-Open No. 9-295016

DISCLOSURE OF THE INVENTION

Problems to be Solved by the Invention

In general, a predicted torque calculated in a rolling schedule is the sum total of upper and lower electric motor torques and, therefore, in a case where the imbalance amount of upper and lower electric motor torques is large and the torque of one electric motor reaches a torque limit, a desired rolling torque is not obtained and this may sometimes impede the rolling schedule itself. In particular, in a rolling mill having relatively short rolling time per pass, as in a roughing mill of a hot rolling line and a roughing mill and a finishing mill of a plate rolling line, it is desired that the recovery time from a speed decrease during material entry be short. However, in the conventional load balance control, it is impossible to cope with excessive upper and lower load imbalance during material entry, and a speed decrease amount becomes large due to insufficient rolling torque when one of the electric motors has reached a torque limit.

In conventional load balance control, importance is attached to the speed coordinating characteristics of the upper and lower electric motors and thermal protection in long operations and, therefore, emphasis is not laid on the quick response of torque correction. An imbalance correction amount is obtained by performing the PI control of a difference in the upper and lower load current values or a difference between the upper and lower load current square values and fed back to the front portion of a speed controller or the front portion of a current controller, and current is supplied to the electric motors via a speed controller and a current controller. Therefore, time delay is great. Furthermore, when the imbalance amount during material entry is large, due to the integration term that load balance control has, the imbalance correction amount during material entry remains also during ordinary rolling after the recovery from a speed decrease and this posed the problem that upper and lower electric motor torques are not balanced.

The present invention was made to solve problems as described above, and provides a driving apparatus of electric motors for reduction rolls that has the functions of minimizing a speed decrease amount during material entry by solving insufficient rolling torque due to excessive roll load imbalance and electric motor torque limit, and rapidly and stably correcting the imbalance of upper and lower loads during ordinary rolling after the recovery from a speed decrease.

Means for Solving the Problems

A driving apparatus of electric motors for reduction rolls related to the present invention is characterized by comprising an upper electric motor speed controller that obtains an upper electric motor torque current reference by inputting a deviation of an actual upper electric motor speed from an upper electric motor speed reference, an upper electric motor torque current limiter and an upper electric motor current controller that control a torque of the upper electric motor so that the deviation of the actual upper electric motor speed from the upper electric motor speed reference becomes zero, a lower electric motor speed controller that obtains a lower electric motor torque current reference by inputting a deviation of an actual lower electric motor speed from a lower electric motor speed reference, a lower electric motor torque current limiter and a lower electric motor current controller that control a torque of the lower electric motor so that the deviation of the actual lower electric motor speed from the lower electric motor speed reference becomes zero, and a torque distribution controller that is provided between the upper and lower electric motor speed controllers and between the upper and lower electric motor torque current limiters, compares the upper and lower electric motor torque current references with a torque current limit value, and obtains a desired rolling torque, in a case where either of the upper and lower torque current references exceeds the torque current limit value, by adding an amount in excess of the torque current limit value to the other torque current reference, thereby minimizing a speed decrease amount during material entry.

Advantages of the Invention

According to the present invention, it is possible to minimize a speed decrease amount during material entry by solving insufficient rolling torque due to excessive roll load imbalance and electric motor torque limit, and to rapidly and stably correct the imbalance of upper and lower loads during ordinary rolling after the recovery from a speed decrease.

DESCRIPTION OF SYMBOL

Figure 1:
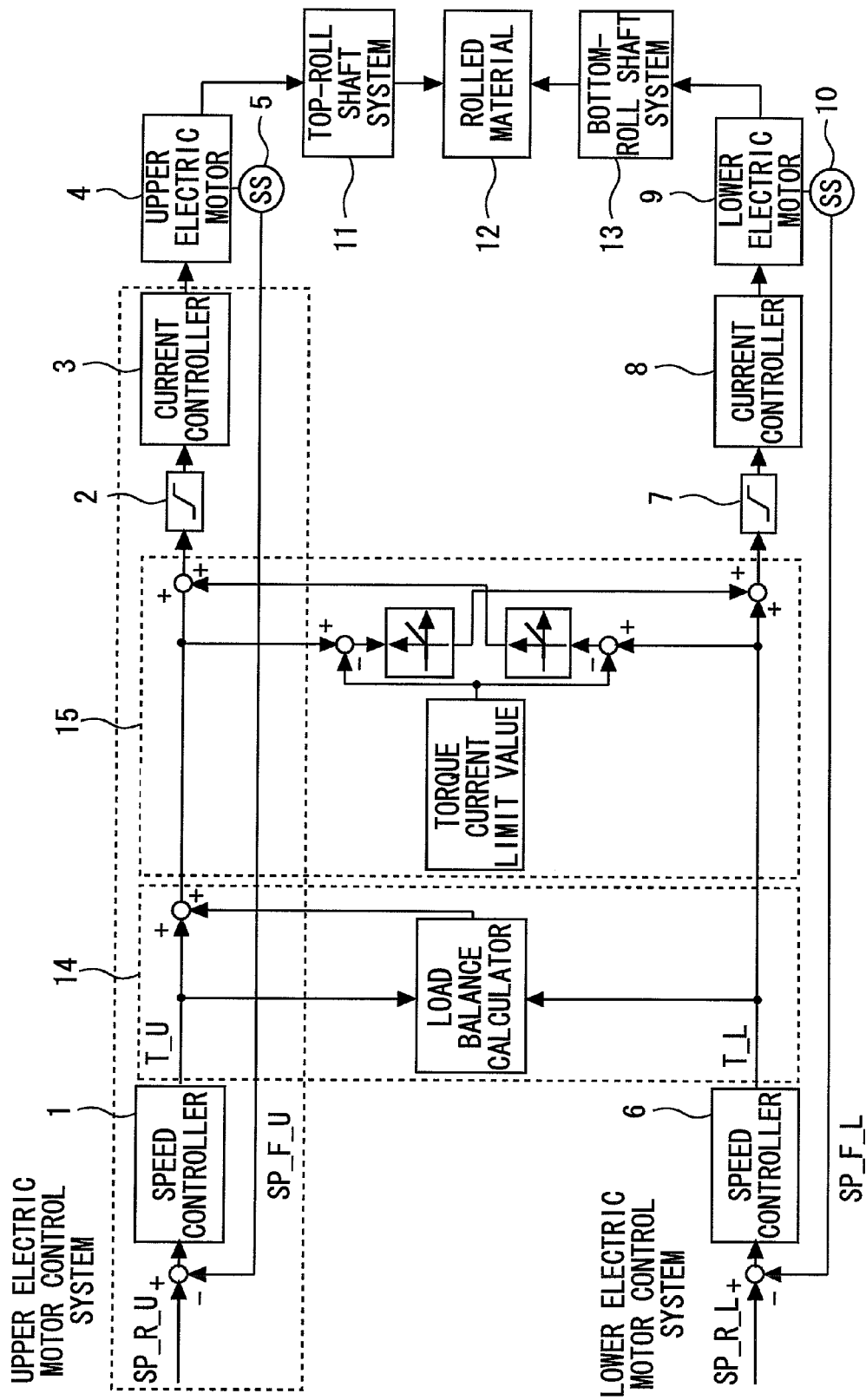
FIG. 1 is a schematic control block diagram that shows a driving apparatus of electric motors for reduction rolls related to the present invention.

1 Upper electric motor speed controller
2 Upper electric motor torque current limiter
3 Upper electric motor current controller
4 Upper electric motor
5 Upper electric motor speed sensor
6 Lower electric motor speed controller
7 Lower electric motor torque current limiter
8 Lower electric motor current controller
9 Lower electric motor
10 Lower electric motor speed sensor
11 Top-roll shaft system
12 Rolled material
13 Bottom-roll shaft system
14 Load balance calculator
15 Torque distribution controller
16 Load balance calculation limiter
17 Load balance calculation rate
18 Load balance calculation P controller

BEST MODE FOR CARRYING OUT THE INVENTION

The present invention will be described in further detail by referring to the accompanying drawings.

Embodiment 1

Figure 2:
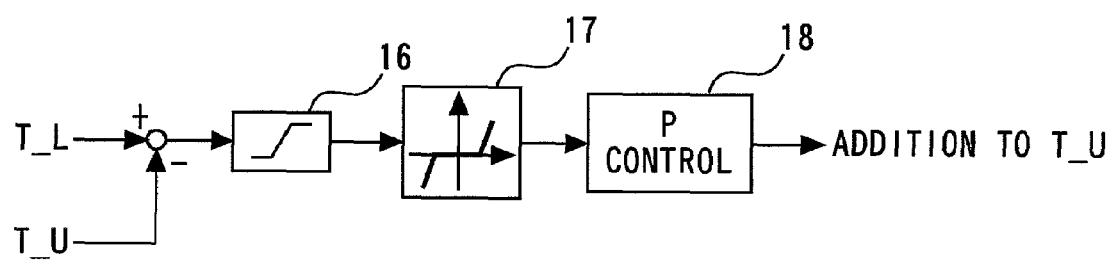
FIG. 2 is a block diagram that shows a load balance calculator of a driving apparatus of electric motors for reduction rolls related to the present invention.

FIG. 1 is a schematic control block diagram that shows a driving apparatus of electric motors for reduction rolls related to the present invention, and FIG. 2 is a block diagram that shows a load balance calculator. In FIG. 1, an upper electric motor control system is constituted by an upper electric motor speed controller 1, an upper electric motor torque current limiter 2 and an upper electric motor current controller 3. The reference numeral 4 denotes an upper electric motor and the reference numeral 5 denotes an upper electric motor speed sensor. A lower electric motor control system is constituted by a lower electric motor speed controller 6, a lower electric motor torque current limiter 7 and a lower electric motor current controller 8. The reference numeral 9 denotes a lower electric motor and the reference numeral 10 denotes a lower electric motor speed sensor. The reference numeral 11 denotes a top-roll shaft system, the reference numeral 12 denotes a rolled material, and the reference numeral 13 denotes a bottom-roll shaft system. The upper electric motor 4 and the lower electric motor 9 have each an independent control system comprising a speed controller and a current controller, and rolling torque outputted from each of the electric motors is transmitted to the rolled material 12 via the top-roll axis system 11 and the bottom-roll axis system 13. The reference numeral 14 denotes a load balance calculator that is provided in a front portion between the upper electric motor speed controller 1 and the lower electric motor speed controller 6, and between the upper electric motor torque current limiter 2 and the lower electric motor torque current limiter 7, and the reference numeral 15 denotes a torque distribution controller that is provided in a rear portion between the upper electric motor speed controller 1 and the lower electric motor speed controller 6, and between the upper electric motor torque current limiter 2 and the lower electric motor torque current limiter 7.

As shown in FIG. 2, the load balance calculator 14 is constituted by a load balance calculation limiter 16, a load balance calculation rate 17 and a load balance calculation proportional controller 18.

Next, the operation will be described. An actual upper electric motor speed SP_F_U detected by the upper electric motor speed sensor 5 is fed back to the front portion of the upper electric motor speed controller 1 and a deviation from the upper electric motor speed reference SP_R_U is inputted to the upper electric motor speed controller 1, whereby an upper electric motor torque current reference T_U is obtained. Furthermore, power is supplied to the upper electric motor 4 via the upper electric motor torque current limiter 2 and the upper electric motor current controller 3. As a result of this, the torque of the upper electric motor 4 is controlled so that a deviation of the actual upper electric motor speed SP_F_U from the upper electric motor speed reference SP_R_U becomes zero.

Similarly, an actual lower electric motor speed SP_F_L detected by the lower electric motor speed sensor 10 is fed back to the front portion of the lower electric motor speed controller 6 and a deviation from the lower electric motor speed reference SP_R_L is inputted to the lower electric motor speed controller 6, whereby a lower electric motor torque current reference T_L is obtained. Furthermore, power is supplied to the lower electric motor 9 via the lower electric motor torque current limiter 7 and the lower electric motor current controller 8. As a result of this, the torque of the lower electric motor 9 is controlled so that a deviation of the actual lower electric motor speed SP_F_L from the lower electric motor speed reference SP_R_L becomes zero.

The rolling torques supplied from the upper electric motor 4 and the lower electric motor 9 are transmitted to the rolled material 12 via the top-roll shaft system 11 and the bottom-roll shaft system 13, respectively. Conversely, the rolling torques are transmitted as load torques from the rolled material 12 to the upper electric motor 4 and the lower electric motor 9, respectively, via the top- and bottom-roll axis systems 11, 13. When the load of each of the top and bottom rolls becomes unbalanced due to the material condition, material shape and the like during the entry of the rolled material 12, this manifests itself as an imbalance between the actual upper electric motor speed SP_F_U and the actual lower electric motor speed SP_F_L, and this eventually produces imbalance between the upper an lower torque currents. When a speed difference is provided between the upper electric motor speed reference SP_R_U and the lower electric motor speed reference SP_R_L in order to control bows at the leading end of the rolled material, imbalance is produced in the upper and lower torque currents during material entry.

If excessive imbalance is produced between the upper and lower torque currents due to such various factors, the torque current reference of one electric motor reaches its limit value and a large margin remains in the torque current reference of the other electric motor, in spite of which the rolling torques become insufficient and the speed decrease amount increases.

Therefore, in order to make the most of the torques that the upper and lower electric motors can produce, in the above-described torque distribution controller 15 a comparison is made between the upper and lower electric motor torque current references T_U, T_L and a torque current limit value. In a case where either of the upper and lower torque current references exceeds the torque current limit value, an amount in excess of the torque current limit value is added to the other torque current reference, whereby a desired rolling torque is obtained and a speed decrease amount is minimized.

By providing the load balance calculator 14, each of the upper and lower torque current references T_U and T_L is inputted to the load balance calculator 14 and an imbalance correction amount is directly added to the upper torque current reference T_U, whereby an imbalance correction with better response than in the conventional load balance control is performed. FIG. 2 is a schematic control block diagram of the load balance calculator 14. A deviation of the upper and lower torque current references T_U, T_L is multiplied by the load balance calculation limiter 16 and the load balance calculation rate 17, P control (proportional control) 18 is performed, and addition to the upper electric motor current reference T_U is performed, whereby a correction is performed. If PI control is performed as in conventional load balance control, in a case where a load imbalance amount during material entry is large, an imbalance correction amount during material entry remains even during ordinary rolling after the recovery from a speed decrease due to an integration term, and the torque may not sometimes be balanced. Therefore, only P control is performed. Incidentally, in this case, control is performed by adding a correction amount to the upper electric motor, with the lower electric motor serving as a master. However, a similar effect is obtained also by allocating ½ of the correction amount to each of the upper and lower torque current references.

INDUSTRIAL APPLICABILITY

In a twin drive rolling mill in which top and bottom reduction rolls are driven by an upper electric motor and a lower electric motor, respectively, the driving apparatus of electric motors for reduction rolls of the present invention can eliminate insufficient rolling torque due to imbalance of upper and lower loads and electric motor torque limit and can balance upper and lower electric motor torques with good response.

The invention claimed is:

1. A driving apparatus of electric motors for reduction rolls in a twin drive rolling mill in which top and bottom reduction rolls are individually driven by an upper electric motor and a lower electric motor, characterized by comprising an upper electric motor speed controller that obtains an upper electric motor torque current reference by inputting a deviation of an actual upper electric motor speed from an upper electric motor speed reference, an upper electric motor torque current limiter and an upper electric motor current controller that control a torque of the upper electric motor so that the deviation of the actual upper electric motor speed from the upper electric motor speed reference becomes zero, a lower electric motor speed controller that obtains a lower electric motor torque current reference by inputting a deviation of an actual lower electric motor speed from a lower electric motor speed reference, a lower electric motor torque current limiter and a lower electric motor current controller that control a torque of the lower electric motor so that the deviation of the actual lower electric motor speed from the lower electric motor speed reference becomes zero, and a torque distribution controller that is provided between the upper and lower motor speed controllers and between the upper and lower electric motor torque current limiters, compares the upper and lower electric motor torque current references with a torque current limit value, and obtains a desired rolling torque, in a case where either of the upper and lower torque current references exceeds the torque current limit value, by adding an amount in excess of the torque current limit value to the other torque current reference, thereby minimizing a speed decrease amount during material entry.

2. The driving apparatus of electric motors for reduction rolls according to claim 1, characterized by further comprising a load balance calculator that inputs the upper and lower electric motor torque current references and directly adds an imbalance correction amount that is calculated to the upper electric motor torque current reference, thereby correcting a load imbalance of the top and bottom rolls.

* * * * *